(12) United States Patent
Barnett

(10) Patent No.: US 8,613,591 B2
(45) Date of Patent: Dec. 24, 2013

(54) FAN CASE ABRADABLE DRAINAGE TRENCH AND SLOT

(75) Inventor: Barry Barnett, Markham (CA)

(73) Assignee: Pratt & Whitney Canada Corp., Longueuil (CA)

(*) Notice: Subject to any disclaimer, the term of this patent is extended or adjusted under 35 U.S.C. 154(b) by 2198 days.

(21) Appl. No.: 11/516,600

(22) Filed: Sep. 7, 2006

(65) Prior Publication Data
US 2008/0063517 A1 Mar. 13, 2008

(51) Int. Cl.
*F01D 25/32* (2006.01)

(52) U.S. Cl.
USPC ..................... 415/169.2; 415/169.4

(58) Field of Classification Search
USPC .......... 415/9, 169.2, 169.4, 173.1, 213.1, 220, 415/221, 168.1, 168.2, 168.4, 169.1, 173.5; 417/423.14; 60/226.1, 39.093
See application file for complete search history.

(56) References Cited

U.S. PATENT DOCUMENTS

| | | | |
|---|---|---|---|
| 5,197,766 A * | 3/1993 | Glover et al. .................... 285/14 |
| 5,769,626 A * | 6/1998 | Hauff et al. ...................... 432/72 |
| 6,149,380 A | 11/2000 | Kuzniar et al. |
| 6,250,244 B1 * | 6/2001 | Dubar et al. ................... 114/264 |
| 6,637,186 B1 | 10/2003 | Van Duyn |
| 6,814,541 B2 | 11/2004 | Evans et al. |
| 6,871,819 B2 | 3/2005 | Garric |
| 7,056,360 B2 * | 6/2006 | Zeck ............................... 48/195 |
| 7,329,097 B2 * | 2/2008 | Kirk ........................... 415/213.1 |

FOREIGN PATENT DOCUMENTS

EP 1 479889 A2 11/2004

* cited by examiner

*Primary Examiner* — Edward Look
*Assistant Examiner* — Aaron R Eastman
(74) *Attorney, Agent, or Firm* — Norton Rose Fulbright LLP

(57) ABSTRACT

A fan case for a gas turbine engine is provided to prevent water from pooling and freezing inside the fan case when the gas turbine is not in operation, and potentially prevent the engine from starting and/or cause engine damage. The fan case is therefore adapted to provide a drainage system allowing water to freely escape the fan case without compromising the structural integrity of the fan case. The fan case comprises: a hollow body; an abradable liner disposed inside the hollow body; a flange on the hollow body defining a surface for mating to a forward part of the engine; and, a first radial slot extending across the mating surface of the hollow body. The abradable liner has an inside surface for circumscribing the fan blades wherein the first radial slot is in a free-draining relation with the inside surface of the abradable liner.

10 Claims, 3 Drawing Sheets

FAN CASE ABRADABLE DRAINAGE TRENCH AND SLOT

TECHNICAL FIELD

The invention relates generally to preventing a pool of water from forming and freezing inside a fan case of a gas turbine engine.

BACKGROUND OF THE ART

The fan case of a turbo-fan gas turbine engine performs several functions in association with the rotating fan in operation. The aerodynamic function of the fan case is to direct the axial flow of air in conjunction with the fan into the bypass duct and compressor of the engine core.

Typically, the fan directs a primary air stream through the compressor and turbines of the engine and secondary airflow through an annular radially outward bypass duct. For the aerodynamic function of the fan case, it is essential that the clearance between the rotating fan blades and the internal surface of the fan case be kept within an acceptable range to maximize the fan efficiency.

Accordingly, it is common practice to line the internal air path surfaces of the fan case with an abradable material. On initial operation of the engine and rotation of the newly manufactured fan, some of the abradable material is rubbed off on contact with the tips of the rotating fan blade to establish a minimal tip gap. During the high speed rotation of the fan, the fan blades stretch elastically due to the centrifugal force subjected upon them. The dynamic stretching causes the tips of the metallic blades to come in contact with the abradable liner and consequently abrade the abradable material. Due to manufacturing tolerances, each fan blade will have its unique variation, and the actual degree of running clearance required and stretching of blades will vary to some degree between different fans. The provision of abradable material therefore allows for minimizing the clearance between the fan blade tips and the annular internal air path surface of the fan case.

During storage, or when an aircraft on which one or more gas turbine engines are installed is not in operation, it is always preferable to shield the inlet of the engine so as to prevent water or any foreign objects from entering. An example of a shield used for this purpose is shown in U.S. Pat. No. 6,871,819 to Garric. Garric discloses a protection device for an air intake structure of a jet engine installed on an aircraft. In particular, this device may be assembled on the air intake structure during long term aircraft storage phases in order to avoid the entry of any foreign elements inside the engine, through the ventilation scoop, the exhaust orifices or the intake of the fan case ducting.

However, such maintenance procedures are not always strictly followed, and therefore, it is sometimes possible for water to penetrate the gas turbine engine and form a pool of water in the fan case. During cold weather conditions, this water pool can freeze. If any fan blade tips are in contact with the water pool when it freezes, the ice can restrain the fan from freely rotating. Since the abradable liner of the fan case has a relatively rough and porous surface, the frozen pool of water strongly adheres to the liner. Consequently, the amount of force required to remove or break the ice can be significant depending on the size of the pool. Therefore, the ice restraint on the fan blade tips can be strong enough to prevent the fan from turning during start up. As a result this can prevent the turbo-fan engine from starting and/or possibly cause engine damage.

Typically, in order to prevent water from pooling in the fan case, drainage features have been fashioned in the form of simple drainage holes drilled through the fan case. However, these drilled drainage holes compromise the structural integrity of the fan case. Particularly, when the drainage holes are located in a critical containment region of the case, the case must be reinforced by increasing the thickness of the fan case in that area. This results in a significant weight and cost increase of the fan case.

Therefore, it is desirable to provide a fan case that is adapted to prevent such water pool and ice from forming on the abradable liner of the fan case wherein the structural integrity of the fan case is not compromised and no significant weight and/or cost increase penalty is incurred.

Features that distinguish the present invention from the background art will be apparent from review of the disclosure, drawings and description of the invention presented below.

DISCLOSURE OF THE INVENTION

Accordingly, the present invention provides a fan case for a gas turbine engine that has a drainage system allowing water to freely escape the fan case when the gas turbine engine is not in operation. Water entering the fan case in the form of rain or melting snow for example is prevented from pooling and freezing inside the fan case. The drainage system does not compromise the structural integrity of the fan case, and therefore, no significant weight and/or cost increase is incurred.

According to one aspect, the present invention provides a fan case for surrounding a fan having blades in a gas turbine engine. The fan case comprises: a hollow body; an abradable liner disposed inside the hollow body; a flange on the hollow body defining a surface for mating to a forward part of the engine; and, a first radial slot extending across the mating surface of the flange. The abradable liner has an inside surface for circumscribing the fan blades and the first radial slot is in a free-draining relation with the inside surface of the abradable liner.

The abradable liner may comprise a radial passage that is aligned with the first radial slot of the hollow body such as to allow the drainage of water from the inside of the liner towards the radial slot.

Advantageously, the abradable liner may also comprise a trench having a length that extends longitudinally from the radial passage. The trench may further comprises a longitudinal and gradual diminution of depth originating from the radial passage.

Alternatively, the abradable liner may comprise a trench having a length and extending longitudinally from the first radial slot; and, creating a radial passage through the abradable liner aligned with the first radial slot. In this case, since the trench is already in communication with the radial slot, the separate radial passage is not required to provide proper drainage.

In the case where several gas turbine engines are mounted at different locations on an aircraft, for example the left and right side of the aircraft, the first radial slot may have to be positioned in accordance with the specific installation attitude of the engine. Therefore according to another aspect, the invention also provides a fan case having a first radial slot and a second radial slot extending across the mating surface of the flange of the hollow body. The first radial slot is in a free-draining relation with the inside surface of the abradable liner in accordance with a first installation attitude of the gas turbine when installed on a first side of an aircraft. The second radial slot is in a free-draining relation with the inside surface of the abradable liner in accordance with a second installation attitude of the gas turbine when installed on a second side of the aircraft.

In such embodiment, the abradable liner may comprise only one radial passage that is associated with both the first radial slot and the second radial slot of the flange. Alternatively, the abradable liner may instead comprise a first radial passage that is aligned with the first radial slot and a second radial passage that is aligned with the second radial slot.

Advantageously, depending on the configuration of the fan case and the abradable liner, the abradable liner may further comprise a first trench having a first length extending longitudinally from the first radial passage; and, a second trench having a second length extending longitudinally from the second radial passage. The trench may further comprise a gradual diminution of depth as described above.

According to a further aspect, the present invention also provides a turbo-fan gas turbine engine having a fan case for surrounding a fan having blades. The fan case comprises: a hollow body; an abradable liner disposed inside the hollow body; a flange on the hollow body defining a surface for mating to a forward part of the engine; and a radial slot extending across the mating surface of the flange. The abradable liner has an inside surface for circumscribing the fan blades and the radial slot is in a free-draining relation with the inside surface of the abradable liner.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
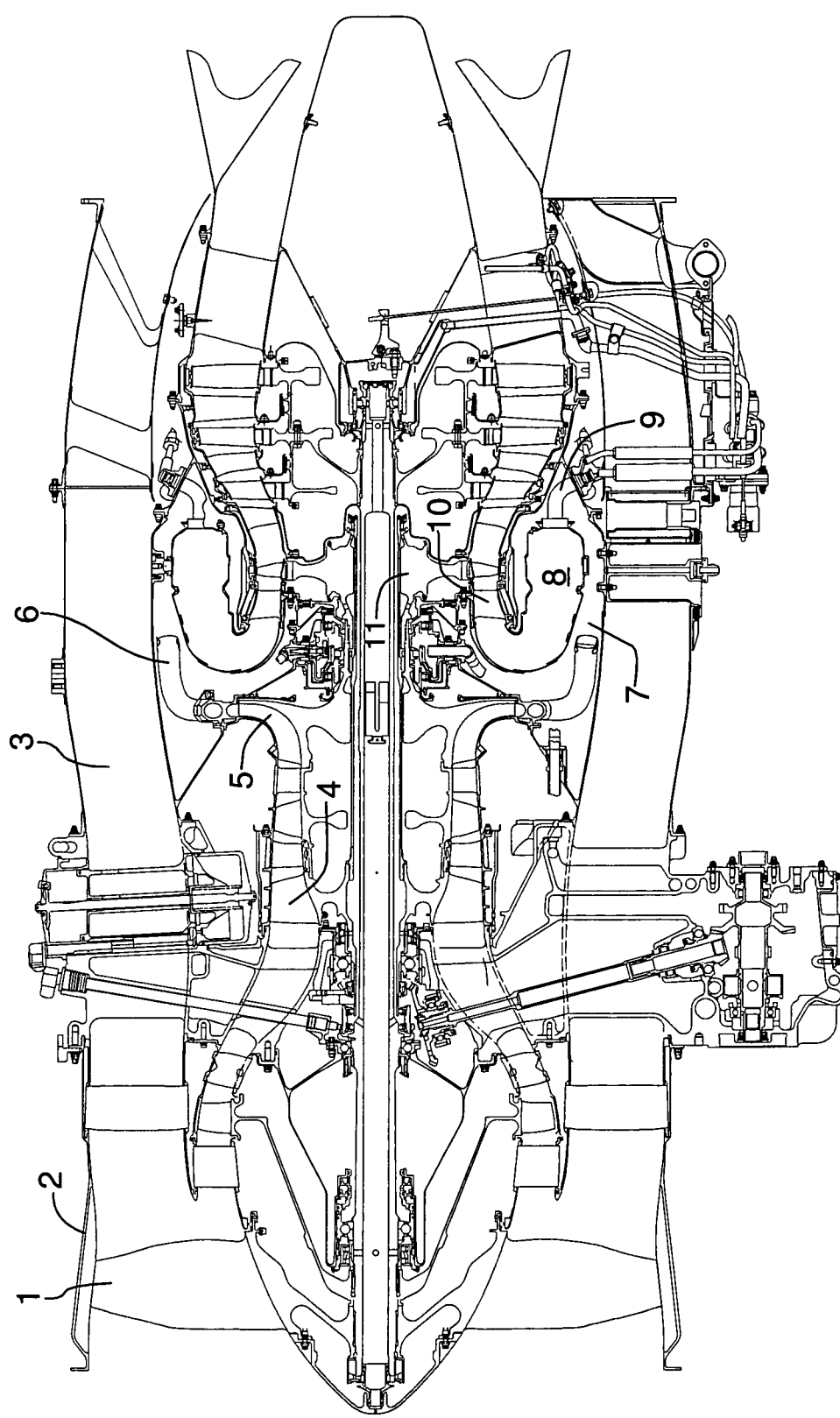
FIG. 1 shows an axial cross-section view of a turbo-fan gas turbine engine.

FIG. 1 shows an axial cross-section through a turbo-fan gas turbine engine. It will be understood however that the invention is equally applicable to any type of engine with a combustor and turbine section such as a turbo-shaft, a turbo-prop, or auxiliary power units. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor 5 through a diffuser 6 and is contained within a plenum 7 that surrounds the combustor 8. Fuel is supplied to the combustor 8 through fuel tubes 9 which is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

Figure 2:
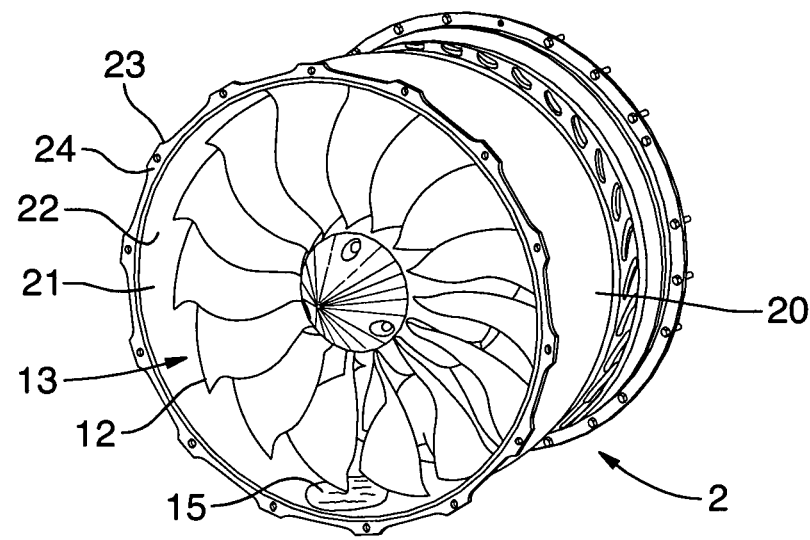
FIG. 2 shows a perspective view of a fan case surrounding a fan of the turbo-fan gas turbine engine of FIG. 1 wherein a pool of water has collected in a lower portion of the fan case.

FIG. 2 shows the fan case 2 that surrounds a fan 13 having an array of fan blades 21. The fan case 2 comprises: a hollow body 20; an abradable liner 21 disposed inside the hollow body 20; and, a flange 23 on the hollow body 20 defining a surface 24 for mating to a forward part of the engine (not shown). The abradable liner 21 has an inside surface 22 that circumscribes the fan blades 12.

FIG. 2 also shows a pool of water 15 accumulated on the inside surface 22 of the abradable liner 21. This undesirable phenomenon occurs when the engine is not in operation and usually is the result of improper adherence to maintenance procedures on the aircraft. During cold weather conditions, the pool of water 15 can freeze quickly and if any fan blade tips 12 are in contact with the pool of water 15 when it freezes, the ice can restrain the fan 13 from freely rotating. Since the abradable liner 21 of the fan case 2 has a relatively rough and porous inside surface 22, the frozen pool of water 15 strongly adheres to the abradable liner 21. Consequently, the restraint on the fan blade tips 12 can be strong enough to prevent the fan 13 from turning during start up and/or possibly cause engine damage.

Figure 3:
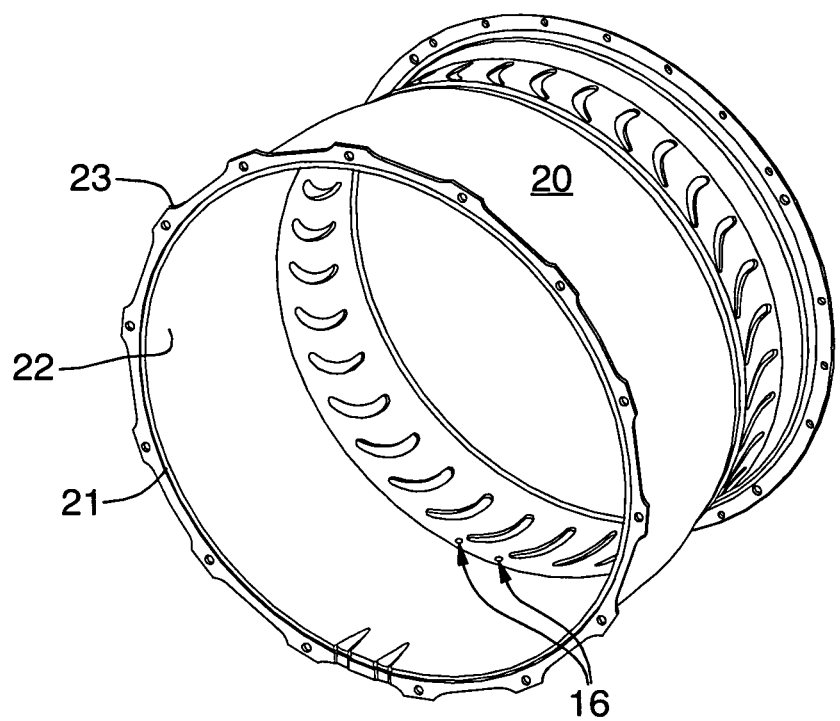
FIG. 3 shows a perspective view of a fan case containing drainage holes.

One typical solution that has been implemented to prevent water from pooling and freezing inside the fan case 2 is illustrate in FIG. 3. The solution comprises of providing simple drainage holes 16 that are drilled through the fan case 2 in order to prevent water from pooling. However, these drilled drainage holes 16 compromise the structural integrity of the fan case 2, and consequently, when the drainage holes 16 are located in a critical containment region of the fan case 2, the fan case 2 must be reinforced by increasing the thickness of the fan case 2 in that area. This results in a significant weight and cost increase of the fan case 2.

Figure 4:
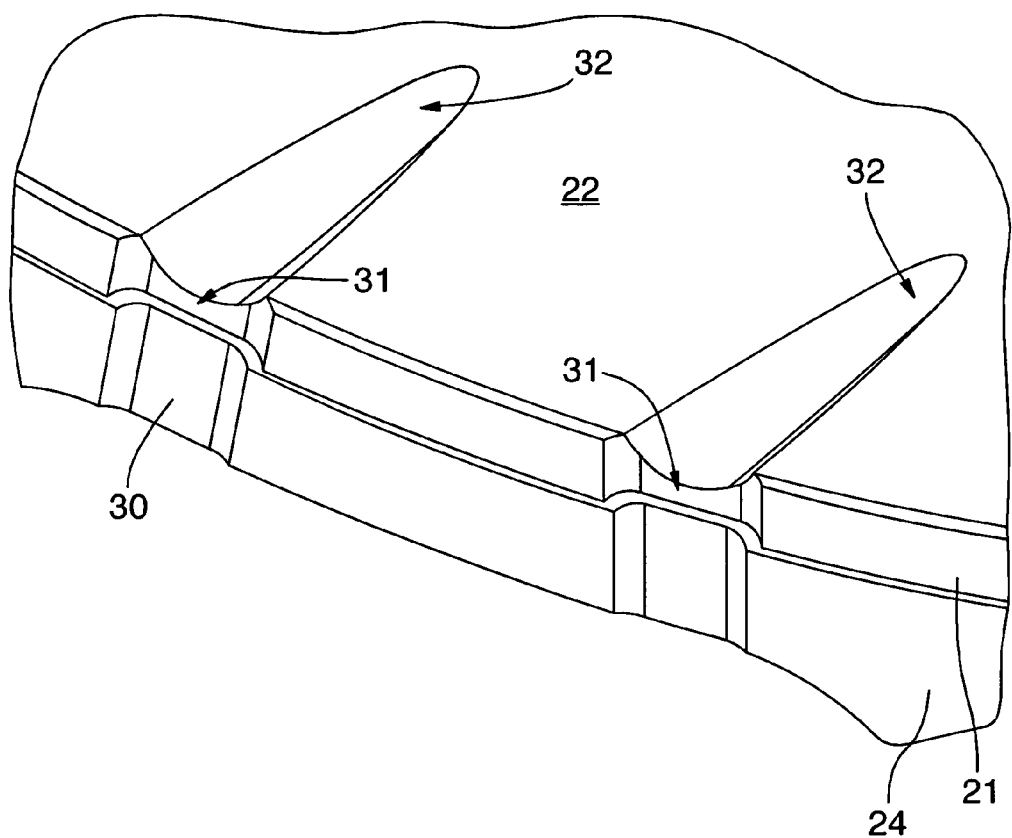
FIG. 4 shows a perspective view of a lower portion of a fan case containing a drainage system according to the present invention.

Accordingly, the present invention provides a fan case 2 for a gas turbine engine that has a drainage system allowing water to freely escape the fan case 2 when the engine is not in operation. One embodiment of such fan case 2 is shown in FIG. 4. In this embodiment, the drainage system in the fan case 2 comprises: radial slots 30 extending across the mating surface 24 of the flange 23; corresponding radial passages 31 in the abradable liner; and corresponding trenches 32, also in the abradable liner.

Referring to FIG. 3, the trenches 32 have a length and extend longitudinally from the radial passage 31 to provide a channel for the water to drain from the inside surface 22 of the abradable liner 21 to the radial slots 30. Depending on the configuration of the fan case 2 and abradable liner 21, the trenches 32 may be required and may comprise a longitudinal and gradual diminution of depth that originates from the radial passage 31 in order to provide the free-draining relation between the radial slots 30 and the inside surface 22 of the abradable liner 21.

The drainage system shown in FIG. 4 illustrates a particular embodiment in which the location of the radial slots 30 correspond to a specific installation attitude of the gas turbine engine on an aircraft (not shown). For example, in the case where a plurality of gas turbine engines are mounted at different locations on an aircraft, for example the left and right side of the aircraft, the first radial slot may have to be positioned in accordance with a first installation attitude of the engine when installed on a first side of the aircraft. Accordingly, the second radial slot may have to be positioned in accordance with a second installation attitude of the engine when installed on a second side of the aircraft. This feature allows an engine having a fan case 2 with two radial slots 30 to be installed on either the right side or the left side of the aircraft and still provide proper drainage. The only requirement is that at least one of the radial slots 30 be in a free-draining relation with the inside surface 22 of the abradable liner 21.

In the case where two radial slots 30 are provided for two different installation attitudes, it is not absolutely necessary for each of the two slots to have their own corresponding radial passage 31 and trench 32. For example, it would also be possible to provide only one trench 32 that would be in communication with both of the radial slots 30 and thereby provide a free-draining relation between the radial slots 30 and the inside surface 22 of the abradable liner 21, for two different installation attitudes.

Alternatively, it is also possible to only have one radial slot 30. As stated above, the only requirement is that the radial slot 30 be in a free-draining relation with the inside surface 22 of the abradable liner 21.

In such an embodiment, it is further possible to have one radial slot 30 and one corresponding trench 32 that has a length and extends longitudinally from the radial slot 30. In this case, since the trench 32 is already in communication with the radial slot 30, the separate radial passage 31 is not required to provide proper drainage.

Since the radial passages 31 and the trenches 32 are located within the abradable liner 21, and, the radial slots 30 are located within the mating surface 24 of the flange 23, the structural integrity of the fan case 2 is not compromised by the drainage system. Therefore, the fan case 2 does not have to be reinforced and this type of drainage system can be adapted to existing fan cases that have an abradable liner. However, since components within gas turbine engines undergo cyclic loading, it is preferable that the radial slots 30, radial passages 31 and trenches 32 have a substantially rounded geometries so as avoid introducing stress risers, and, minimize the potential for cracks to initiate within the fan case 2 and/or the abradable liner 21.

Another advantage of the present invention is that it is relatively easy to manufacture. For example, the radial slots 30 can be machined into the steel fan case 2 using a conventional milling machine and the radial passages 31 can be molded directly in to the abradable liner 21 which is a composite material.

Further, it is common practice to repair the abradable material due to cracking or foreign object damage with the turbo-fan engine installed on a wing of an aircraft. Advantageously, with this drainage system design, it is also possible to carry out repair of the abradable liner 21 at the drainage system location to restore the drainage system geometry using simple machining fixtures and power hand tools.

Although the above description relates to a specific preferred embodiment as presently contemplated by the inventor, it will be understood that the invention in its broad aspect includes mechanical and functional equivalents of the elements described herein.

I claim:

1. A fan case for surrounding a fan having blades in a gas turbine engine comprising:
   a hollow body;
   an abradable liner disposed inside the hollow body, the abradable liner having an inside surface for circumscribing the fan blades;
   a flange on the hollow body defining a surface for mating to a forward part of the engine;
   a first radial slot extending across the mating surface of the flange, wherein the first radial slot is in a free-draining relation with the inside surface of the abradable liner; and
   wherein the abradable liner comprises:
      a radial passage, through the abradable liner, aligned with the first radial slot.

2. A fan case as claimed in claim 1, wherein the abradable liner comprises a trench having a length and extending longitudinally from the radial passage.

3. A fan case as claimed in claim 2, wherein the trench comprises a longitudinal and gradual diminution of depth originating from the radial passage.

4. A fan case as claimed in claim 1, wherein the first radial slot is in a free-draining relation with the inside surface of the abradable liner in accordance with a first installation attitude of the gas turbine when installed on a first side of an aircraft.

5. A fan case as claimed in claim 4, wherein the hollow body further comprises a second radial slot extending across the mating surface of the hollow body, wherein the second radial slot is in a free-draining relation with the inside surface of the abradable liner in accordance with a second installation attitude of the gas turbine when installed on a second side of the aircraft.

6. A fan case as claimed in claim 5, wherein the abradable liner comprises a radial passage associated with both the first radial slot and the second radial slot of the hollow body.

7. A fan case as claimed in claim 5, wherein the abradable liner comprises a first radial passage aligned with the first radial slot and a second radial passage aligned with the second radial slot.

8. A fan case as claimed in claim 7, wherein the abradable liner comprises:
   a first trench having a first length and extending longitudinally from the first radial passage; and,
   a second trench having a second length and extending longitudinally from the second radial passage.

9. A fan case as claimed in claim 8, wherein
   the first trench comprises a longitudinal and gradual diminution of depth originating from the first radial passage; and,
   the second trench comprises a longitudinal and gradual diminution of depth originating from the second radial passage.

10. A turbo-fan gas turbine engine having a fan case for surrounding a fan having blades, the fan case comprising:
   a hollow body;
   an abradable liner disposed inside the hollow body, the abradable liner having an inside surface for circumscribing the fan blades;
   a flange on the hollow body defining a surface for mating to a forward part of the engine;
   a first radial slot extending across the mating surface of the flange, wherein the first radial slot is in a free-draining relation with the inside surface of the abradable liner; and
   wherein the abradable liner comprises:
      a radial passage, through the abradable liner, aligned with the first radial slot.

* * * * *